(12) United States Patent
Aldana

(10) Patent No.: US 11,910,332 B2
(45) Date of Patent: Feb. 20, 2024

(54) SYSTEMS AND METHODS OF CONFIGURING A SPECTRAL MASK

(71) Applicant: Meta Platforms Technologies, LLC, Menlo Park, CA (US)

(72) Inventor: Carlos Horacio Aldana, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 25 days.

(21) Appl. No.: 17/504,107

(22) Filed: Oct. 18, 2021

(65) Prior Publication Data

US 2022/0159585 A1    May 19, 2022

Related U.S. Application Data

(60) Provisional application No. 63/115,441, filed on Nov. 18, 2020.

(51) Int. Cl.
| | | |
|---|---|---|
| *H04W 52/34* | (2009.01) | |
| *H04W 72/0453* | (2023.01) | |
| *H04W 52/42* | (2009.01) | |
| *H04B 1/04* | (2006.01) | |

(52) U.S. Cl.
CPC .............. *H04W 52/34* (2013.01); *H04B 1/04* (2013.01); *H04W 52/42* (2013.01); *H04W 72/0453* (2013.01); *H04B 2001/0416* (2013.01)

(58) Field of Classification Search
CPC . H04W 52/34; H04W 52/42; H04W 72/0453; H04B 1/04; H04B 2001/0416
See application file for complete search history.

(56) References Cited

U.S. PATENT DOCUMENTS

| | | | | | |
|---|---|---|---|---|---|
| 7,636,641 | B1 * | 12/2009 | Dua | ................. | H03M 7/30 |
| | | | | | 702/86 |
| 9,209,872 | B2 * | 12/2015 | Stacey | ................ | H04W 8/186 |
| 9,401,801 | B1 * | 7/2016 | Park | ..................... | H04B 15/06 |
| 10,333,685 | B2 * | 6/2019 | Loehr | ................... | H04L 1/0046 |
| 10,637,630 | B2 * | 4/2020 | Park | ................... | H04L 25/0226 |
| 11,558,079 | B2 * | 1/2023 | Raghavan | ............. | H04B 1/525 |
| 2011/0081858 | A1 * | 4/2011 | Tolentino | ............ | H04W 52/245 |
| | | | | | 455/63.1 |
| 2013/0343433 | A1 * | 12/2013 | Yang | ................... | H04B 17/102 |
| | | | | | 375/146 |

(Continued)

FOREIGN PATENT DOCUMENTS

| | | |
|---|---|---|
| CN | 110740465 A | 1/2020 |
| WO | 2013169750 A1 | 11/2013 |

OTHER PUBLICATIONS

International Search Report and Written Opinion for International Application No. PCT/US2021/059293, dated Mar. 3, 2022, 11 pages.

*Primary Examiner* — Hai V Nguyen

(74) *Attorney, Agent, or Firm* — Foley & Lardner LLP

(57) ABSTRACT

Systems and methods for configuring a spectral mask include a transmitting device which maintains a plurality of spectral masks for signal transmissions. The transmitting device determines a channel to transmit a signal. The transmitting device selects a first spectral mask from the plurality of spectral masks according to the determined channel to transmit the signal. The transmitting device transmits the signal in the determined channel to a receiving device according to the first spectral mask.

20 Claims, 11 Drawing Sheets

(56) References Cited

U.S. PATENT DOCUMENTS

| | | | |
|---|---|---|---|
| 2015/0264626 A1* | 9/2015 | Perdomo | H04L 67/52 370/216 |
| 2016/0242183 A1* | 8/2016 | Kang | H04W 72/1215 |
| 2019/0103951 A1* | 4/2019 | Park | H04W 72/0446 |
| 2019/0195776 A1* | 6/2019 | Liebel | G02B 21/14 |
| 2023/0276515 A1* | 8/2023 | Xu | H04R 1/1041 370/329 |

* cited by examiner

SYSTEMS AND METHODS OF CONFIGURING A SPECTRAL MASK

CROSS-REFERENCE TO RELATED PATENT APPLICATIONS

This application claims the benefit of and priority to U.S. Provisional Appl. No. 63/115,441, filed Nov. 18, 2020, the contents of which are incorporated herein by reference in their entirety.

FIELD OF DISCLOSURE

The present disclosure is generally related to communication and data transmissions, including but not limited to configuring a spectral mask for a transmitter.

BACKGROUND

There are various standards for data transmissions to eliminate cross-talk or interference between channels. Additionally, some standards may relate to out of band emissions (OOBE) for particular frequencies. To ensure conformance with the various standards, some transmitters may use a spectral mask for transmitting signals. However, some spectral masks may not deliver optimal performance characteristics.

SUMMARY

In one aspect, this disclosure is directed to a method. The method may include maintaining, by a transmitting device, a plurality of spectral masks for signal transmissions. The method may include determining, by the transmitting device, a channel to transmit a signal. The method may include selecting, by the transmitting device according to the determined channel, a first spectral mask from the plurality of spectral masks, to transmit the signal. The method may include transmitting, by the transmitting device, the signal in the determined channel to a receiving device according to the first spectral mask.

In some embodiments, the method includes selecting the first spectral mask from the plurality of spectral masks according to a proximity of the channel to a defined frequency. In some embodiments, the defined frequency is 5835 megaHertz. In some embodiments, the first spectral mask defines a maximum transmission power across a channel width of the channel, and a fall-off from the maximum transmission power for frequencies beyond a frequency band of the channel width. In some embodiments, the fall-off has a first slope for a first frequency band and a second slope for a second frequency band, and the first frequency band is between the frequency band of the channel width and the second frequency band. In some embodiments, the fall-off has a slope that defines a maximum transmission power of the signal at each of a plurality of frequencies beyond a frequency band of the channel width.

In some embodiments, the method includes maintaining, by the transmitting device, a mapping between each of a plurality of channels and at least one corresponding spectral mask of the plurality of spectral masks. The method may further include selecting, by the transmitting device, the first spectral mask according to a first mapping between the determined channel and the first spectral mask. In some embodiments, selecting the first spectral mask includes determining, by the transmitting device according to the first mapping, that the first spectral mask and a second spectral mask are mapped to the determined channel, and selecting, by the transmitting device, the first spectral mask instead of the second spectral mask, according to a proximity of the determined channel to a defined frequency. In some embodiments, the method includes maintaining, by the transmitting device, a mapping between each of a plurality of channels and a corresponding maximum transmission power. The method may further include determining, by the transmitting device, the first spectral mask according to the corresponding maximum transmission power for the determined channel. In some embodiments, maintaining the plurality of spectral masks includes maintaining, by the one or more processors, a first spectral mask defining a first maximum transmission power and a second spectral mask defining a second maximum transmission power.

In another aspect, this disclosure is directed to a transmitting device. The transmitting device includes one or more processors configured to maintain a plurality of spectral masks for signal transmissions. The one or more processors are configured to determine a channel to transmit a signal. The one or more processors are configured to select, according to the determined channel, a first spectral mask from the plurality of spectral masks, to transmit the signal. The one or more processors are configured to transmit the signal in the determined channel to a receiving device according to the first spectral mask.

In some embodiments, the one or more processors are configured to select the first spectral mask from the plurality of spectral masks according to a proximity of the channel to a defined frequency. In some embodiments, the first spectral mask defines a maximum transmission power across a channel width of the channel, and a fall-off from the maximum transmission power for frequencies beyond a frequency band of the channel width. In some embodiments, the fall-off has a first slope for a first frequency band and a second slope for a second frequency band, and the first frequency band is between the frequency band of the channel width and the second frequency band. In some embodiments, the fall-off has a slope that defines a maximum transmission power of the signal at each of a plurality of frequencies beyond a frequency band of the channel width.

In some embodiments, the one or more processors are further configured to maintain a mapping between each of a plurality of channels and at least one corresponding spectral mask of the plurality of spectral masks, and select the first spectral mask according to a first mapping between the determined channel and the first spectral mask. In some embodiments, selecting the first spectral mask includes determining, according to the first mapping, that the first spectral mask and a second spectral mask are mapped to the determined channel, and selecting the first spectral mask instead of the second spectral mask, according to a proximity of the determined channel to a defined frequency. In some embodiments, the one or more processors are further configured to maintain a mapping between each of a plurality of channels and a corresponding maximum transmission power, and determine the first spectral mask according to the corresponding maximum transmission power for the determined channel. In some embodiments, maintaining the plurality of spectral masks comprises maintaining a first spectral mask defining a first maximum transmission power and a second spectral mask defining a second maximum transmission power.

In another aspect, this disclosure is directed to a non-transitory computer readable medium storing instructions that, when executed by one or more processors, cause the one or more processors to maintain a plurality of spectral masks for signal transmissions. The instructions further cause the one or more processors to determine a channel to transmit a signal. The instructions further cause the one or more processors to select, according to the determined channel, a first spectral mask from the plurality of spectral masks, to transmit the signal. The instructions further cause the one or more processors to transmit the signal in the determined channel to a receiving device according to the first spectral mask.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are related to systems and methods for configuring a spectral mask used by (or applied in) a transmitting device according to a selected channel for a signal to be transmitted. The systems and methods described herein may (e.g., adaptively or selectively) determine, select, or otherwise configure a spectral mask according to a selected channel for a transmitting a signal.

Figure 1:
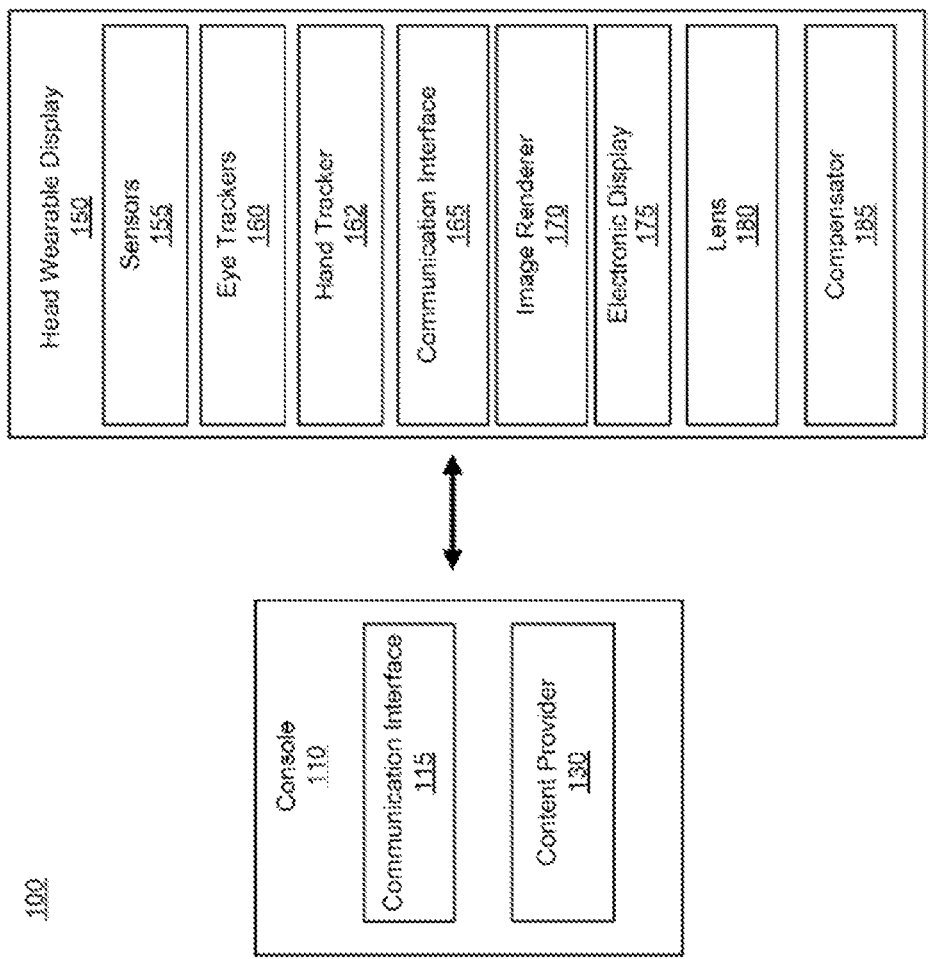
FIG. 1 is a diagram of a system environment including an artificial reality system, according to an example implementation of the present disclosure.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
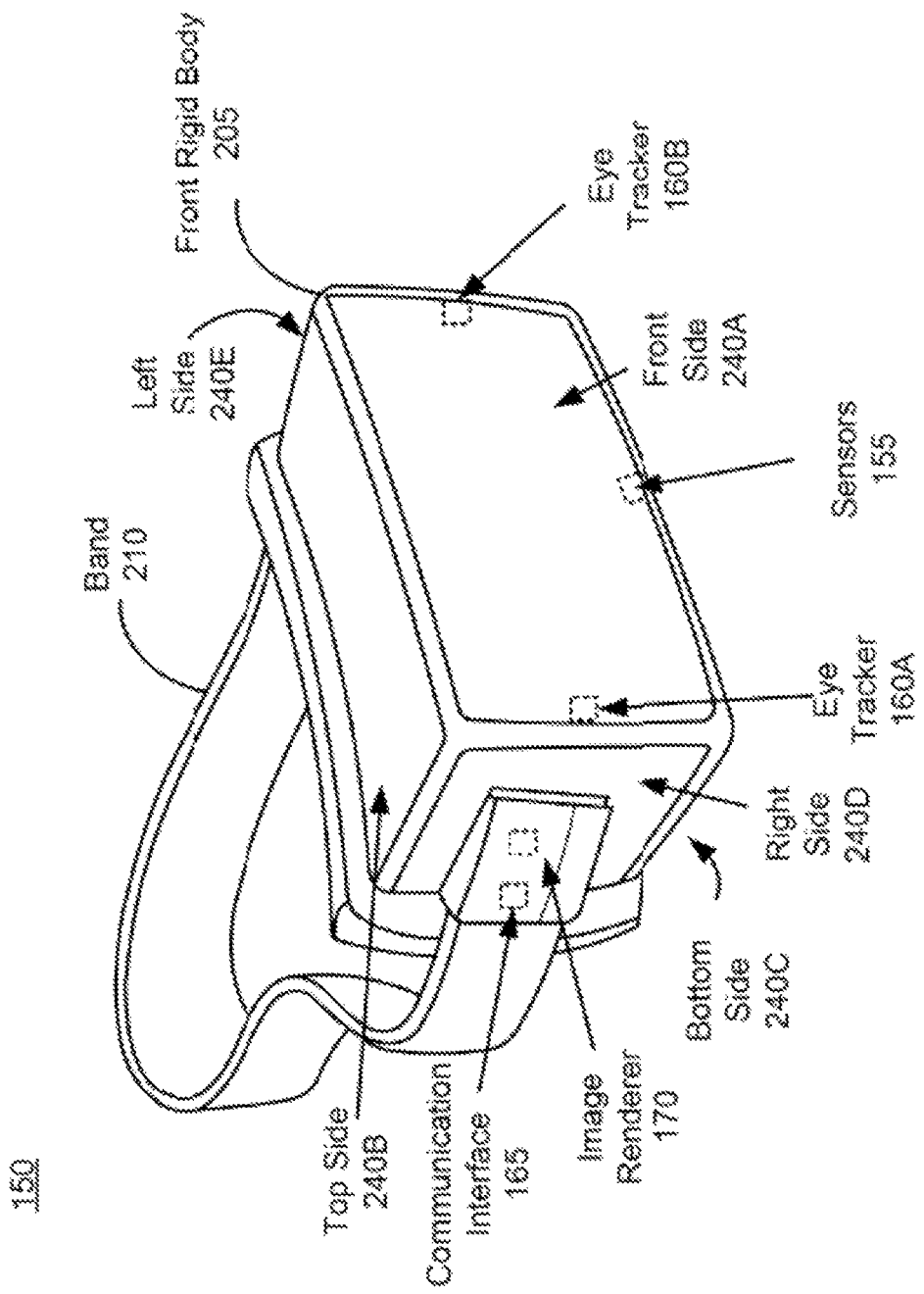
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
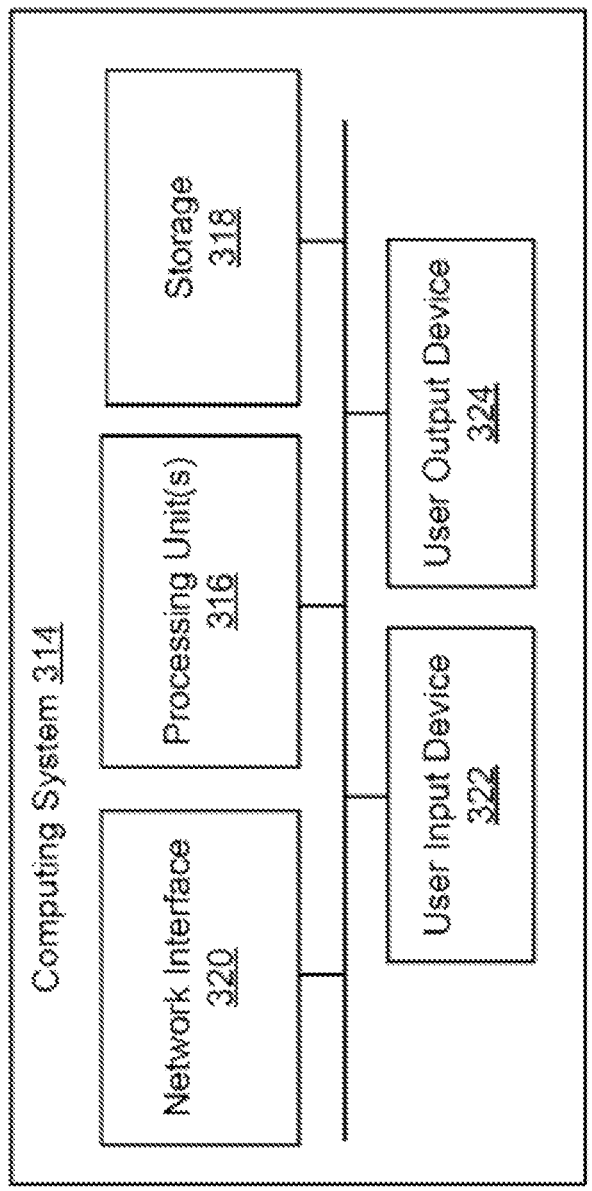
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

The present disclosure relates to transceivers (e.g., transmitters, transmitting devices, receivers, and/or receiving devices) operating on the 5-6 GigaHertz (GHz) frequency spectrum (although the concepts disclosed herein can similarly apply to devices operating at/over other frequencies). When a transmitter transmits a signal, the signal may have (or be restricted to conform to) some fall-off from a reference level (e.g., a maximum transmission power level) outside of a channel bandwidth. Some standards may be applied to transmitters to ensure that the signal follows a defined fall-off (e.g., an upper bound/limit for transmission poser that is a function of frequency). For example, the European Telecommunications Standards Institute (ETSI) may have standards relating the defined fall-off for signals transmitted by a transmitter in various frequency spectrums, including Wi-Fi spectrum and cellular devices operating in the 5 GHz frequency spectrum. The standards may be implemented to avoid, for example, interference between different channels or spectrums of channels (for example, between the 5 GHz and 6 GHz frequency spectrums). According to the implementations and embodiments described herein, a transmitting device may dynamically select, configure, modify, or otherwise determine a spectral mask based on a selected channel. The transmitting device may determine the spectral mask to attenuate a signal (transmission power) based on a proximity of the signal's transmission channel to a defined frequency (e.g., 5935 MHz), such as to avoid signal leakage from one frequency band (such as unlicensed national information infrastructure [U-NII]-4 band) to another frequency band (such as U-NII-5 band).

Figure 4:
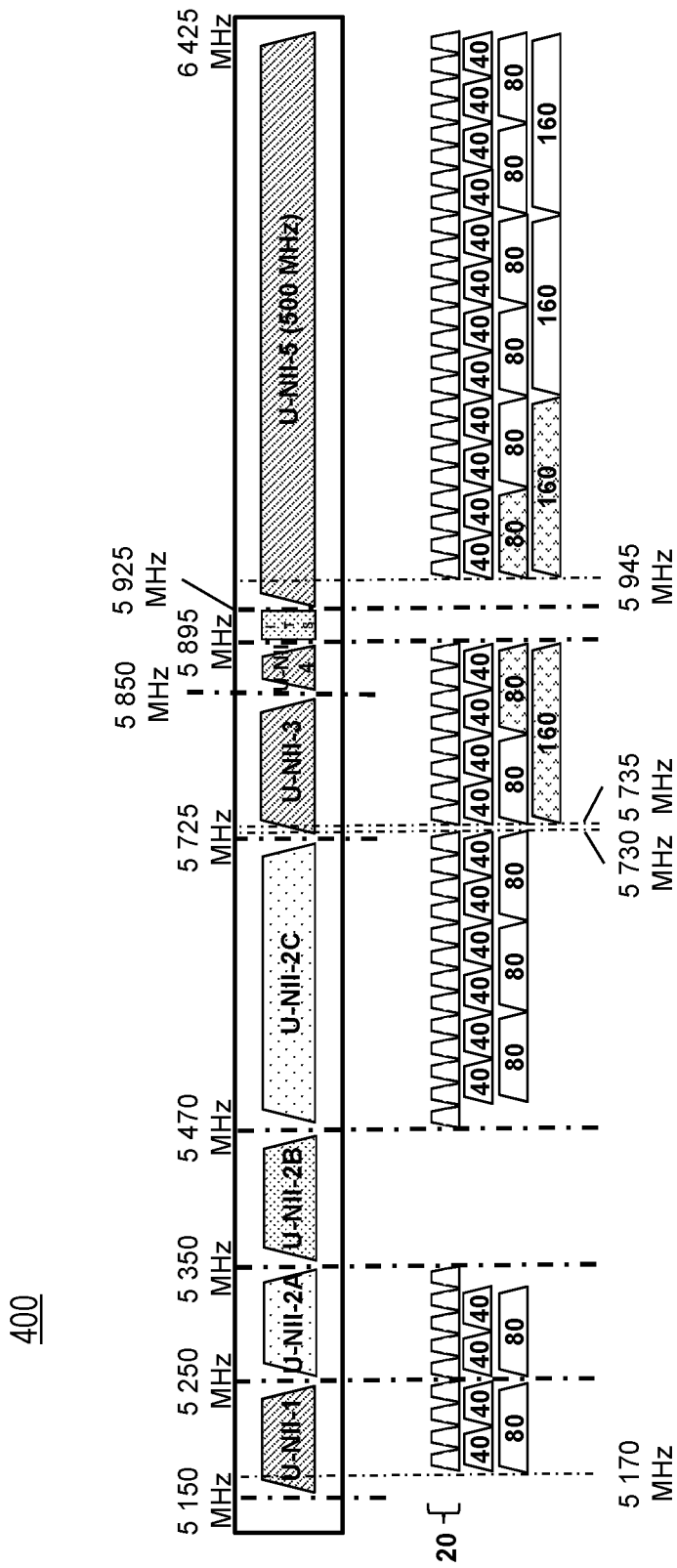
FIG. 4 is an example 5 GigaHertz (GHz) channel configuration according to an example implementation of the present disclosure.

Referring now to FIG. 4, depicted is a chart 400 of an example 5 GHz and 6 GHz channel configuration according to an example implementation of the present disclosure. In the chart 400 shown in FIG. 4, a frequency spectrum may be separated into different frequency bands (e.g., U-NII-1 band between 5,150 MegaHertz [MHz] to 5,250 MHz, U-NII-2 band between 5,250 MHz and 5,350 MHz, U-NII-2B band between 5,350 MHz and 5,470 MHz, U-NII-2C band between 5,470 MHz and 5,730 MHz, U-NII-3 band between 5,735 MHz and 5,850 MHz, U-NII-4 band between 5,850 MHz and 5,895 MHz, intelligent transportation system (ITS) band between 5,895 MHz and 5,925 MHz, and U-NII-5 band between 5,945 MHz and 6,425 MHz). Each band may include various number of channels within the band, with channels having different channel widths (e.g., 20 MHz, 40 MHz, 80 MHz, 160 MHz, etc.). As described in greater detail below, a transmitting device may select one of the channels within a particular frequency band for sending a signal. The transmitting device may transmit the signal according to (e.g., its transmission power limited by) a spectral mask. A respective spectral mask may have a constant or continuous maximum transmission power across a channel width of the channel, and a fall-off from the maximum transmission power for frequencies beyond a frequency band of the channel width.

In some instances, a channel configuration may include one or more out-of-band emission (OOBE) defined frequencies. An OOBE defined frequency, or more generally referred to herein as a defined frequency, may be or include a frequency in which a combined power of signals transmitted at the frequency are to be less than a predetermined threshold (for example, −22 dBm/MHz for low power indoor (LPI) transmitters, −45 dBm/MHz for very low power (VLP) transmitters, etc.). In some embodiments, for channels or frequency bands near or adjacent to the defined frequency, signals transmitted on those channels may not attenuate rapidly enough such that a sum of the signals at the defined frequency may exceed or otherwise do not satisfy the predetermined threshold.

Figure 5:
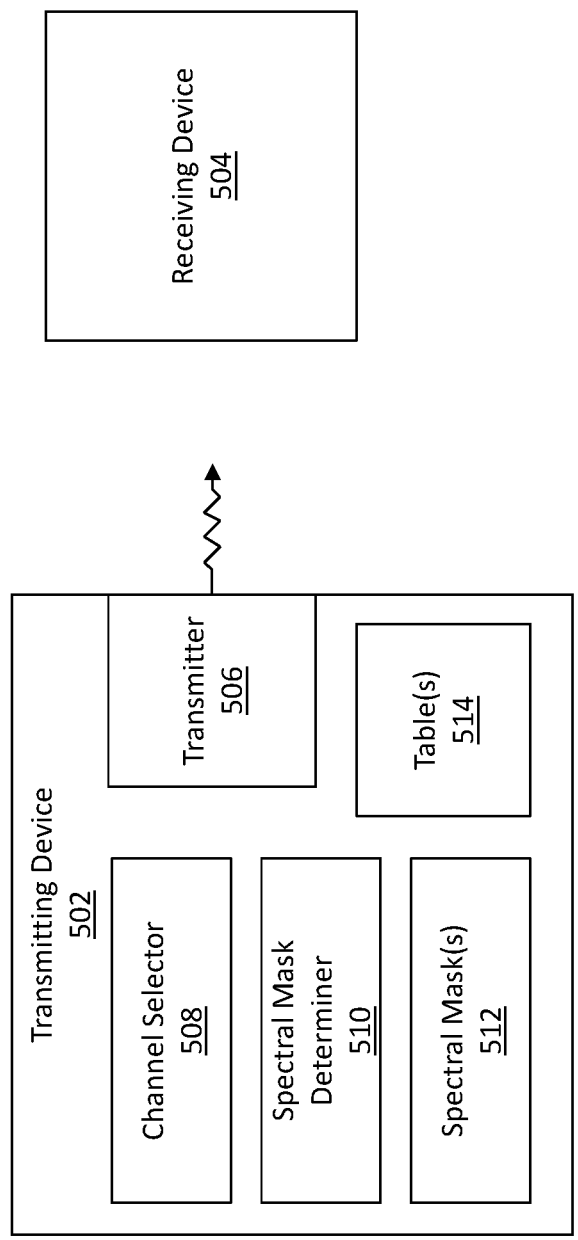
FIG. 5 is a block diagram of a system environment including a transmitting device and a receiving device according to an example implementation of the present disclosure.

Referring now to FIG. 5, depicted is a block diagram of a system 500 including a transmitting device 502 and a receiving device 504, according to an example implementation of the present disclosure. The transmitting device 502 may include a transmitter 508 configured to transmit wireless signals to the receiving device 504. In some embodiments, the transmitter 508 may be or include one or more antennas tuned to transmit signals in one or more of the frequency bands described above with reference to FIG. 4. The transmitting device 502 and receiving device 504 may be cellular-based devices, Wi-Fi based devices, and/or other devices communicating or configured to communicate on one or more of the frequency bands described above with reference to FIG. 4.

The transmitting device 502 may include a channel selector 508. The channel selector 508 may be or include any device, component, element, and/or hardware configured to select a channel which is to be used for transmitting a signal to the receiving device 504. In some embodiments, the channel selector 508 may be configured to select a channel from one or more of the channels described above with reference to FIG. 4. The channels may include, for example, 20 MHz channels, 40 MHz channels, 80 MHz channels, 160 MHz channels, etc. The channel selector 508 may be configured to select a channel within a respective frequency band. For instance, and in some embodiments, the channel selector 508 may be configured to select a channel by negotiating the channel with the receiving device 504 (e.g., through a channel negotiation process or algorithm). In some embodiments, the channel selector 508 may be configured to transmit a handshake packet or signal on one or more of the channels within a frequency band. The receiving device 504 may listen on various channels (e.g., in a round-robin) for the handshake packet. For instance, the channel selector 508 may be configured to select a channel responsive to receiving a handshake response from the receiving device 504 on one of the channels. In some embodiments, the channel selector 508 may be configured to select a channel according to a channel schedule, which may be set by a master device in the environment of the transmitting device 502. In some embodiments, the channel selector 508 may be configured to select a channel according to detected interference on respective channels within the frequency band. For example, the channel selector 508 may be configured to scan channels within the frequency band and can identify a channel in which the channel selector 508 does not detect any interference in the environment.

The transmitting device 502 may include a spectral mask determiner 510. The spectral mask determiner 510 may be or include any device, component, element, and/or hardware configured to select, identify, configure, or otherwise determine a spectral mask according to the channel selected by the channel selector 508. In some embodiments, the spectral mask determiner 510 may be configured to identify or determine the channel selected by the channel selector 508. The spectral mask determiner 510 may be configured to use the determined channel selected (e.g., from a plurality of candidate spectral masks) by the channel selector 508 for selecting a spectral mask to transmit a signal. For instance, and as described in greater detail below, as the selected channel approaches a defined frequency (e.g., 5935 MHz), the spectral mask determiner 510 may select a spectral mask which attenuates the signal (transmission power) beyond a channel width of the channel such that the signal satisfies a predetermined/desired threshold/level at the defined frequency.

Figure 6:
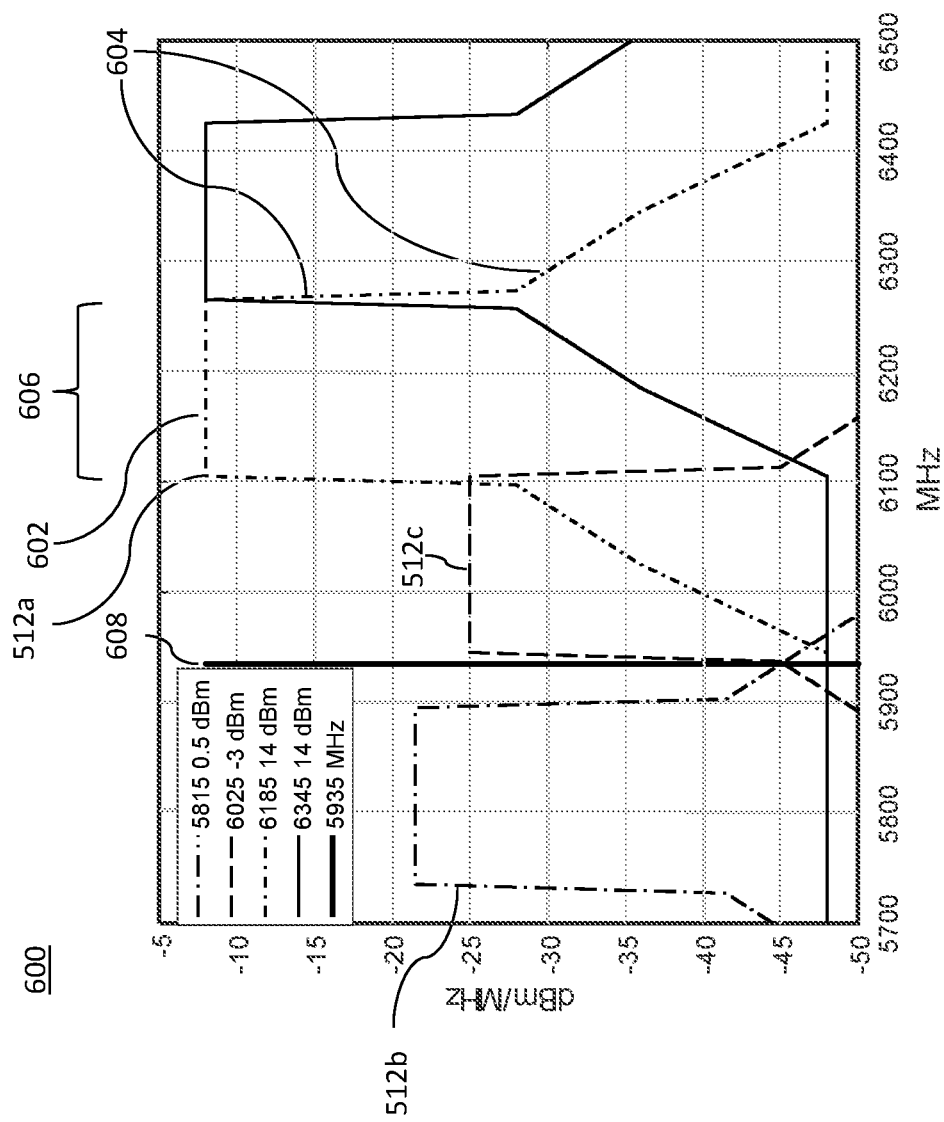
FIG. 6 is an example of spectral masks for 160 MegaHertz (MHz) bandwidth channels which may be used by the transmitting device near a defined frequency according to an example implementation of the present disclosure.
Figure 7:
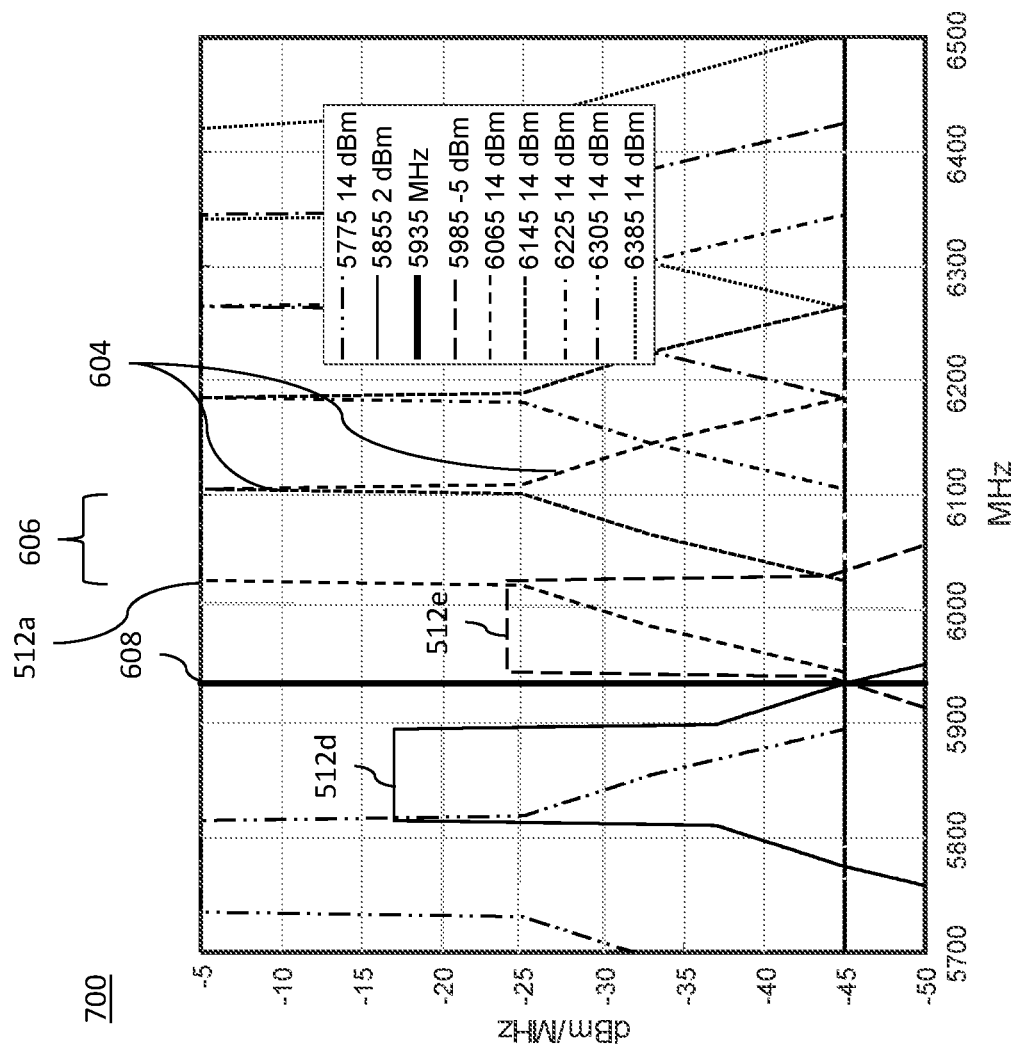
FIG. 7 is an example of spectral masks for 80 MHz bandwidth channels which may be used by the transmitting device near a defined frequency according to an example implementation of the present disclosure.

Referring to FIG. 5 in conjunction with FIG. 6-FIG. 9, the transmitting device 502 may determine or select the spectral mask from a plurality of spectral masks 512. For instance, the transmitting device 502 may be configured to maintain a plurality of spectral masks 512. Specifically, FIG. 6-FIG. 9 depict various examples of spectral masks which may be used, selected, or otherwise determined by the spectral mask determiner 510 for transmitting a signal. In some embodiments, the spectral mask determiner 510 may be configured to select, configure, or otherwise determine a spectral mask according to a proximity of the channel to a defined frequency, such as, for example, 5,935 MHz (as shown in FIG. 6 and FIG. 7), though other defined frequencies may be used, set, or otherwise defined.

The spectral mask determiner 510 may be configured to select or determine a spectral mask 512 from the plurality of spectral masks 512 according to the channel selected by the channel selector 508. In some embodiments, the spectral mask determiner 510 may be configured to maintain a first spectral mask 512. The first spectral mask may be a spectral mask as set forth in one or more standards, such as a spectral mask set forth (or adopted or defined) by ETSI. The spectral mask determiner 510 may, in some embodiments, be configured to modify, update, adapt, or otherwise configure the first spectral mask to generate or determine a second spectral mask 512. The spectral mask determiner 510 may be configured to configure the first spectral mask to determine a (e.g., more restrictive) second spectral mask 512 based on a proximity of the selected channel to the defined frequency. In some embodiments, the spectral mask determiner 510 may be configured to determine the second spectral mask 512 based on a proximity of the selected channel to the defined frequency and a channel width of the channel. Various examples of these and other embodiments are described in greater detail below.

Referring specifically to FIG. 6 and FIG. 7, depicted are examples of graphs 600, 700 showing spectral masks for 160 MegaHertz (MHz) bandwidth channels and 80 MHz bandwidth channels, respectively, which may be used by the transmitting device 502 near a defined frequency, according to an example implementation of the present disclosure. The spectral masks 512 shown in FIG. 6, for example, are shown to have a reference (maximum) transmission power 602 across a channel width of the respective channels, and a fall-off 604 from the maximum transmission power for frequencies beyond a frequency band 606 of the channel width. The spectral masks may be defined or otherwise configured in reference to a reference transmission power. The reference transmission power may be defined as a power spectral density in dBm/MHz (or watts). In the example shown in FIG. 6, the reference transmission power of at least some of the spectral masks 512 may be −8 dBm/MHz. In the example shown in FIG. 7, the reference transmission power of at least some of the spectral masks 512 may be −5 dBm/MHz.

As shown in FIG. 6 and FIG. 7, the graphs 600, 700 may include a defined frequency 608, 702. In the example shown in FIG. 6, the defined frequency 608 may be 5,935 MHz. As described above, the defined frequency may be a frequency in the frequency spectrum in which signal transmissions are to be capped/limited/restricted/attenuated to have a power less than a predetermined threshold. The predetermined threshold may be, for example, −22 dBm/MHz for low power indoor (LPI) transmitters, −45 dBm/MHz for very low power (VLP) transmitters, etc. As such, any signals sent on channels which are adjacent or proximate to the defined frequency 608 should follow (e.g., be bounded by) a spectral mask 512 which attenuates the corresponding signals such that a sum of each of the resultant/attenuated signals is less than the predetermined threshold.

In some embodiments, the spectral mask determiner 510 may be configured to modify, update, or otherwise configure the maximum transmission power of the first spectral mask 512a to generate additional spectral mask(s) 512n, based on a proximity of the channel selected by the channel selector 508 to the defined frequency 608, 702. Referring specifically to FIG. 6, and in some embodiments, the spectral mask determiner 510 may be configured to modify the reference transmission power of the first spectral mask 512a to generate a second (and third, etc.) spectral masks 512b, 512c. The spectral mask determiner 510 may be configured to modify the reference transmission power in proportion to, based on, or according to a distance/proximity between the selected channel and the defined frequency 608.

As shown in FIG. 6, where a reference transmission power is −8 dBm/MHz, the maximum transmission power for the first spectral mask 512a may be 14 dBM. The spectral mask determiner 510 may be configured to select the first spectral mask 512a for transmitting signals on the 6,185 MHz and 6,345 MHz channels, since the corresponding signals would attenuate to below the predetermined threshold at the defined frequency. However, the spectral mask determiner 510 may be configured to modify the reference transmission power for the first spectral mask 512a to generate/apply/implement the second and third spectral masks 512b, 512c for transmitting signals on the 5,815 MHz and 6,025 MHz channels, respectively. The spectral mask determiner 510 may select/apply the second and third spectral masks 512b, 512c for transmitting signals on the 5,815 MHz and 6,025 MHz channels, respectively, based on the proximity of those channels to the defined frequency 608.

For the 5,815 MHz channel (e.g., spanning between 5,735 MHz and 5,895 MHz for a 160 MHz channel width), the spectral mask determiner 510 may modify the reference transmission power by reducing the maximum transmission power of the first spectral mask 512a by 13.5 dBm to 0.5 dBm. As such, the reference transmission power for the second spectral mask 512b may be −21.5 dBm/MHz. As shown in FIG. 6, the second spectral mask 512b may fall off (e.g., vary or change) in a manner similar to the fall-off 604 for first spectral mask 512a. However, because the reference transmission power for the second spectral mask 512b is reduced (or further restricted/lowered) from the reference transmission power for the first spectral mask 512a, the power of the signal sent on the 5,815 MHz channel may be less than or equal to the predetermined threshold (e.g., −45 dBm/MHz) at the defined frequency 608.

Similarly, for the 6,025 MHz channel (e.g., spanning between 5,845 MHz and 6,105 MHz for a 160 MHz channel width), the spectral mask determiner 510 may modify the reference transmission power by reducing the maximum transmission power of the first spectral mask 512a by 17 dBm to −3 dBm. As such, the reference transmission power for the third spectral mask 512c may be −25 dBm/MHz. As shown in FIG. 6, the third spectral mask 512c may fall off in a manner similar to the fall-off 604 (e.g., gradient/slope/profile/shape) for first and second spectral masks 512a, 512b. However, because the reference transmission power for the third spectral mask 512c is reduced from the reference transmission power for the first spectral mask 512a, the power of the signal sent on the 6,025 MHz channel may be less than or equal to the predetermined threshold (e.g., −45 dBm/MHz) at the defined frequency 608.

As shown in FIG. 7, where a reference transmission power is −7 dBm/MHz, the maximum transmission power for the first spectral mask 512a may again be 14 dBm. The spectral mask determiner 510 may be configured to select the first spectral mask 512a for transmitting signals on the 5,775 MHz, 6,065 MHz, 6,145 MHz, 6,305 MHz, 6,385 MHz, and 6,465 MHz channels, since the corresponding signals would attenuate to below the predetermined threshold at the defined frequency. However, the spectral mask determiner 510 may be configured to modify the reference transmission power for the first spectral mask 512a to generate/implement fourth and fifth spectral masks 512d, 512e for transmitting signals on the 5,855 MHz and 5,985 MHz channels, respectively. The spectral mask determiner 510 may select/apply the fourth and fifth spectral masks 512d, 512e for transmitting signals on the 5,855 MHz and 5,985 MHz channels, respectively, based on the proximity of those channels to the defined frequency 608.

For the 5,855 MHz channel (e.g., spanning between 5,815 MHz and 5,895 MHz for an 80 MHz channel width), the spectral mask determiner 510 may modify the reference transmission power by reducing the maximum transmission power of the first spectral mask 512a by 12 dBm to 2 dBm. As such, the reference transmission power for the fourth spectral mask 512d may be −17 dBm/MHz. As shown in FIG. 7, the second spectral mask 512d may fall off (e.g., vary/change) in a manner similar to the fall-off 604 for first spectral mask 512a. However, because the reference transmission power for the fourth spectral mask 512d is reduced (or further restricted/limited) from the reference transmission power for the first spectral mask 512a, the power of the signal sent on the 5,855 MHz channel may be less than or equal to the predetermined threshold (e.g., −45 dBm/MHz) at the defined frequency 608.

Similarly, for the 5,985 MHz channel (e.g., spanning between 5,945 MHz and 6,025 MHz for an 80 MHz channel width), the spectral mask determiner 510 may modify the reference transmission power by reducing the maximum transmission power of the first spectral mask 512a by 18 dBm to −5 dBm. As such, the reference transmission power for the fifth spectral mask 512e may be −23 dBm/MHz. As shown in FIG. 7, the fifth spectral mask 512e may fall off in a manner similar to the fall-off 604 for first and fourth spectral masks 512a, 512d. However, because the reference transmission power for the fifth spectral mask 512e is reduced from the reference transmission power for the first spectral mask 512a, the power of the signal sent/applied/used on the 5,985 MHz channel may be less than or equal to the predetermined threshold (e.g., −45 dBm/MHz) at the defined frequency 608.

Accordingly, rather than not using these channels which are near the defined frequency 608 because the fall-off would not satisfy the predetermined threshold at the defined frequency, the spectral mask determiner 610 may be configured to determine, configure, or otherwise select a spectral mask 512 in which the (combined) power of signals sent on those channels would attenuate to less than the predetermined threshold at the defined frequency.

In some embodiments, the spectral mask determiner 510 may be configured to maintain, include, or otherwise access one or more mappings. For instance, the transmitting device 502 may be configured to maintain one or more tables 514 (e.g., mappings, associations). In some embodiments, the tables 514 may include mappings of channels and corresponding reference transmission powers. In some embodiments, the tables 514 may include mappings of channels and corresponding spectral masks 512. The spectral mask determiner 510 may be configured to identify, determine, or otherwise select/apply a spectral mask 512 using the table and the channel selected by the channel selector 508. The spectral mask determiner 510 may be configured to perform a look-up in the table(s) 514 using the channel selected by the channel selector 508 to identify or otherwise select the corresponding spectral mask 512. For instance, where the tables 514 include a mapping between channels and corresponding spectral masks 512, the spectral mask determiner 510 may be configured to identify the spectral mask 512 which is to be used or selected for a corresponding channel. As another example, where the tables 514 include a mapping between channels and reference (or maximum) transmission powers, the spectral mask determiner 510 may be configured to identify the reference or maximum transmission power for the corresponding channel, and can update, revise, configure, determine, or otherwise select a spectral mask 512 based on the reference or maximum transmission power.

Figure 8:
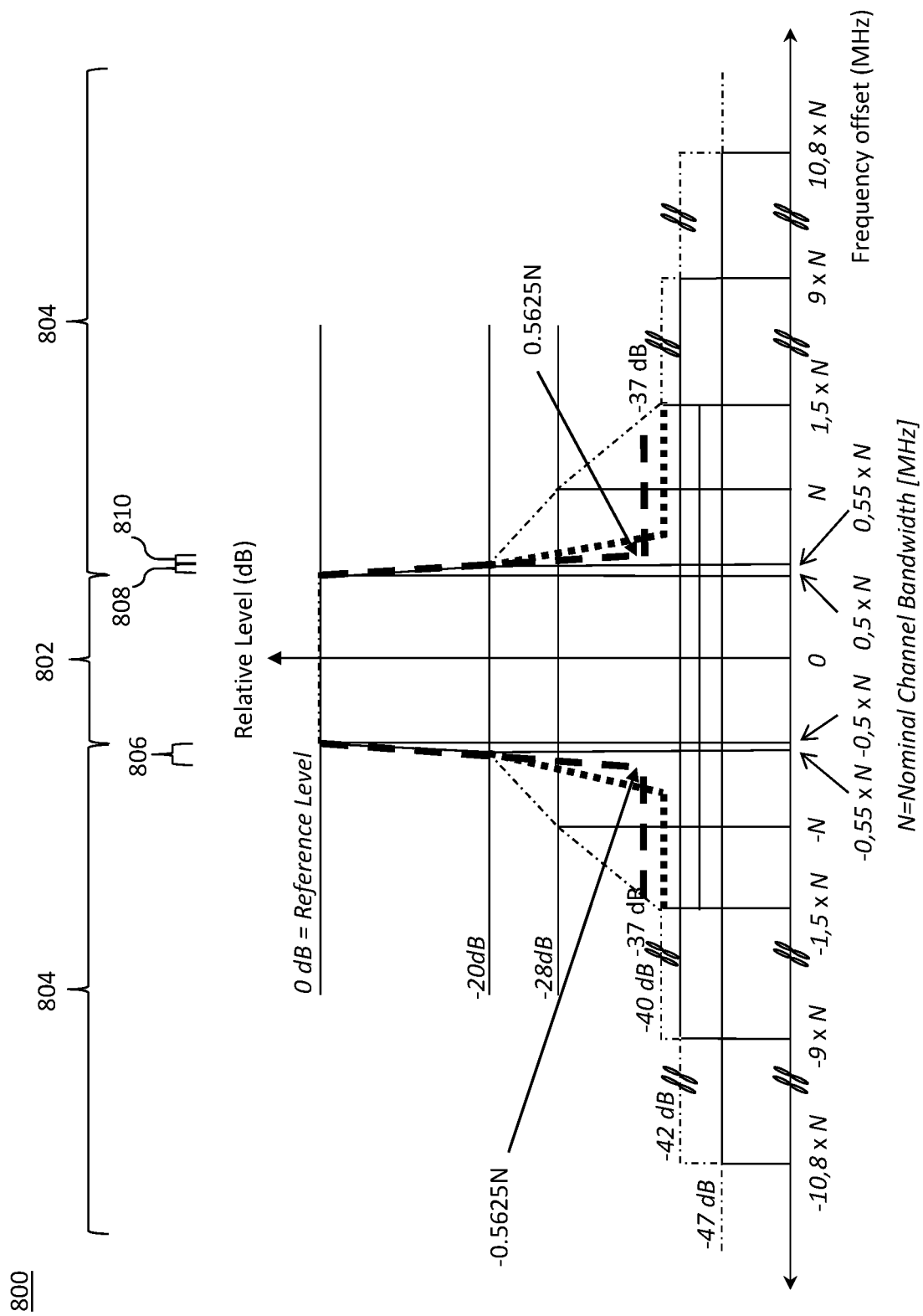
FIG. 8 is an example of a modified spectral mask which may be used by the transmitting device according to an example implementation of the present disclosure.

Referring now to FIG. 8, depicted is an example of a modified/alternative spectral mask 800 which may be used by the transmitting device 502 according to an example implementation of the present disclosure. In some embodiments, the spectral mask 800 may be used for channel bandwidths of 80 MHz and 160 MHz. The spectral mask 800 may be used by transmitting devices 502 which are VLP. However, the spectral mask 800 may be used for any channel bandwidths (e.g., 20 MHz channels, 40 MHz channels, 80 MHz channels, 160 MHz channels, etc.). The spectral mask 800 may deviate from or be modified/adapted from a spectral mask set, included in, or otherwise defined by one or more standards (such a spectral mask defined in standards set by ETSI). The spectral mask 800 may at least partially follow the spectral mask defined by the one or more standards. The spectral mask 800 may include a frequency band 802 which spans a channel width corresponding to the respective channel bandwidth. In the frequency band 802, the spectral mask 800 may follow a reference power transmission level (e.g., shown as 0 dB). The reference power transmission level may correspond to a maximum transmission power for signal sent in a corresponding channel using the spectral mask 800.

The spectral mask 800 may also include a fall-off 804 (e.g., decline or variation) for frequencies outside the channel width for the frequency band 802. The spectral mask 800 may recover lost channels which are near to the defined frequency without having to reduce the maximum transmission power of the corresponding signals by providing a tighter (or more restrictive) fall-off 804 (e.g., a higher/ steeper slope value than a slope value of a corresponding fall-off of the spectral mask defined by the one or more standards). As shown in FIG. 8, the fall-off 804 may include a slope/gradient spanning across a frequency band 802 outside of the frequency band 802 (e.g., on opposite or opposing sides of the frequency band 802). In some embodiments, the slope of the fall-off 804 may be constant for the frequency band 806. The frequency band 806 may be between 0.5 N or –0.5 N (where N is the nominal channel bandwidth of the frequency band 802) and 0.5625 N or –0.625 N. Across the frequency band 806, the maximum transmission power may fall from the reference level (e.g., at 0 dB) to –37 dB, such that the slope of the fall-off 804 may be approximately 592 dB/MHz in the frequency band. The fall-off 804 may follow the slope shown in the frequency band 806 by including one or more filters for signals sent on the corresponding channel.

In some embodiments, the spectral mask 800 may include different slopes for multiple frequency bands/portions 808, 810 outside of the frequency band 802. For example, the fall-off may include a first slope for a first frequency band 808 outside of the frequency band 802, and a second slope for a second frequency band 810 outside of the first frequency band 808. The first frequency band 808 may be between 0.5 N or –0.5 N and 0.55 N or –0.55 N. In the first frequency band 808, the maximum transmission power may fall from the reference level to –20 dB, such that the slope is 20 dB/(0.5*N) dB/MHz (or –20 dB/(0.5*N) MHz), which may generally follow the spectral mask defined by the one or more standards. The second frequency band 810 may be between 0.55 N or –0.55 N and 0.75 N or –0.75 N. In the second frequency band 810, the maximum transmission power may fall from –20 dB to –40 dB, such that the slope is 20 dB/(0.5*N) dB/MHz (or –20 dB/(0.5*N) MHz). In this example, rather than following the spectral mask defined by the one or more standards (which would have a slope of 17.77 dB/N MHz from 0.55 N or –0.55 N and 1 N or –1 N), the signal would be attenuated faster between 0.55 N or –0.55 N and 0.5625 or –0.5625 N. Following the second frequency band 810 (or frequency band 806), the maximum transmission power for the channel may be constant until reaching 1.5 N or –1.5 N, where the maximum transmission power may generally follow the spectral mask defined by the one or more standards. By providing signal power attenuation in the frequency bands 806-810 as described herein, the spectral mask 800 may recover lost 80 and/or 160 MHz channels which are near the defined frequency without having to reduce the maximum transmission power in the frequency band 802.

Figure 9:
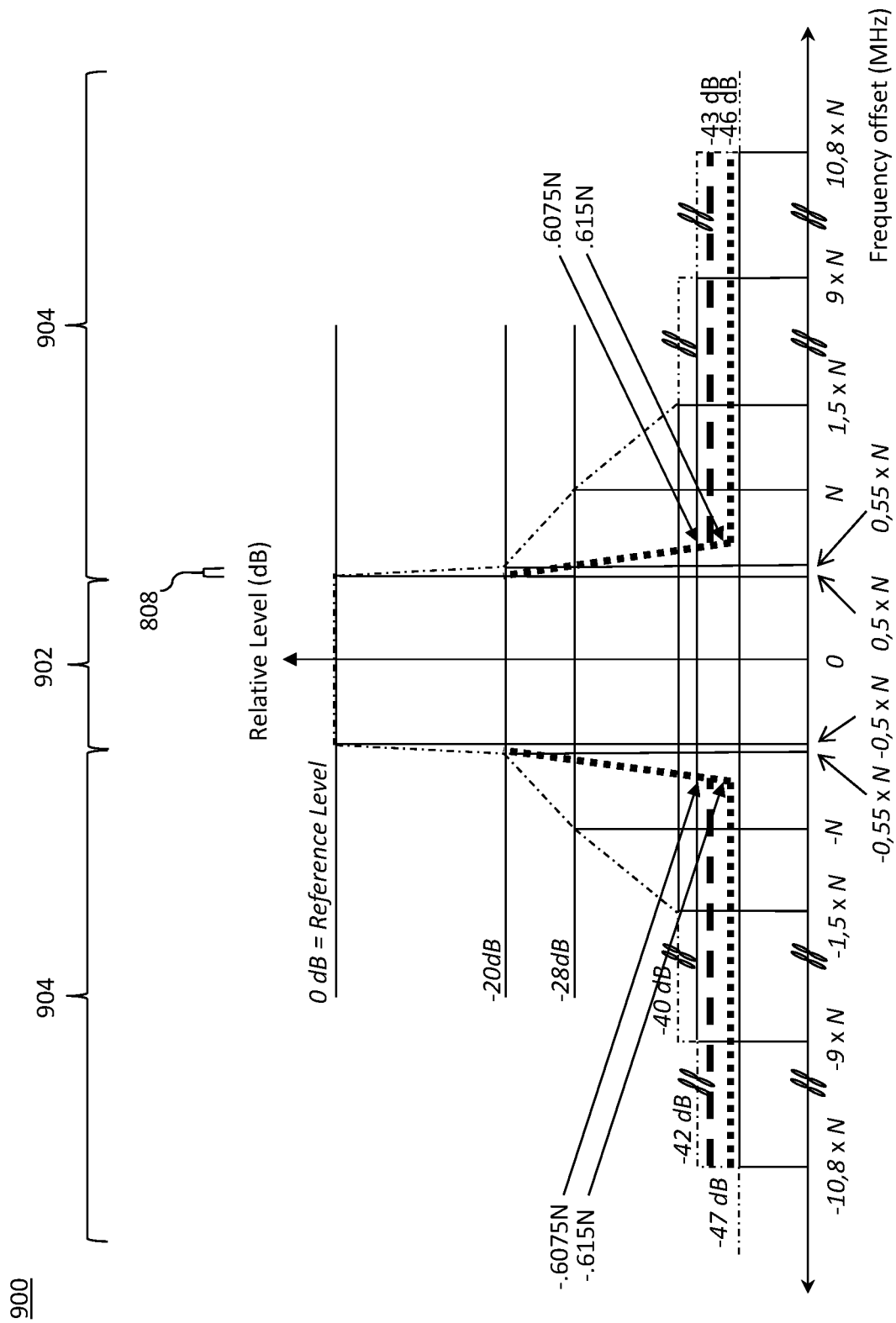
FIG. 9 is another example of a modified spectral mask which may be used by the transmitting device according to an example implementation of the present disclosure.

Referring now to FIG. 9, depicted is another example of a modified/alternative spectral mask 900 which may be used by the transmitting device 502 according to an example implementation of the present disclosure. In some embodiments, the spectral mask 900 may be used for channel bandwidths of 20 MHz and 40 MHz. The spectral mask 900 may be used by transmitting devices 502 which are VLP. Similar to FIG. 8, the spectral mask 900 may include a frequency band 902 across a channel width of the channel, and a fall-off 904 for frequencies outside of the channel width of the channel. In the example shown in FIG. 9, the spectral mask 900 may generally follow the fall-off 804 for frequency bands 808, 810 described above with reference to FIG. 8. However, in this example, the slope of the fall-off 804 described above with reference to frequency band 810 may extend for greater range of frequencies. For example, in the first frequency band 808, the maximum transmission power may fall from the reference level to –20 dB, such that the slope is 400 dB/MHz (or –400 dB/MHz), which may generally follow the spectral mask defined by the one or more standards.

In the example spectral mask 900 shown in FIG. 9, the slope may be maintained for an additional frequency band. In some embodiments, the additional frequency band may extend between 0.55 N or –0.55 N and 0.6075 N or –0.6075 N, such that the maximum transmission power for the signal is –43 dB. In some embodiments, the additional frequency band may extend between 0.55 N or –0.55 N and 0.615 N or −0.615 N, such that the maximum transmission power for the signal is −46 dB. In some embodiments, similar to the spectral mask 800 described above, following attenuating the signal to −43 dB or −46 dB, the signal may have a constant power until reaching 10.8 N (or −10.8 N), where the maximum transmission power may generally follow the spectral mask defined by the one or more standards. By providing signal attenuation in the additional frequency band outside of the first frequency band 808, the spectral mask 900 may recover lost 20 and 40 MHz channels which are near the defined frequency, except for the 20 MHz channel which includes, encompasses, or otherwise carries the defined frequency.

Figure 10:
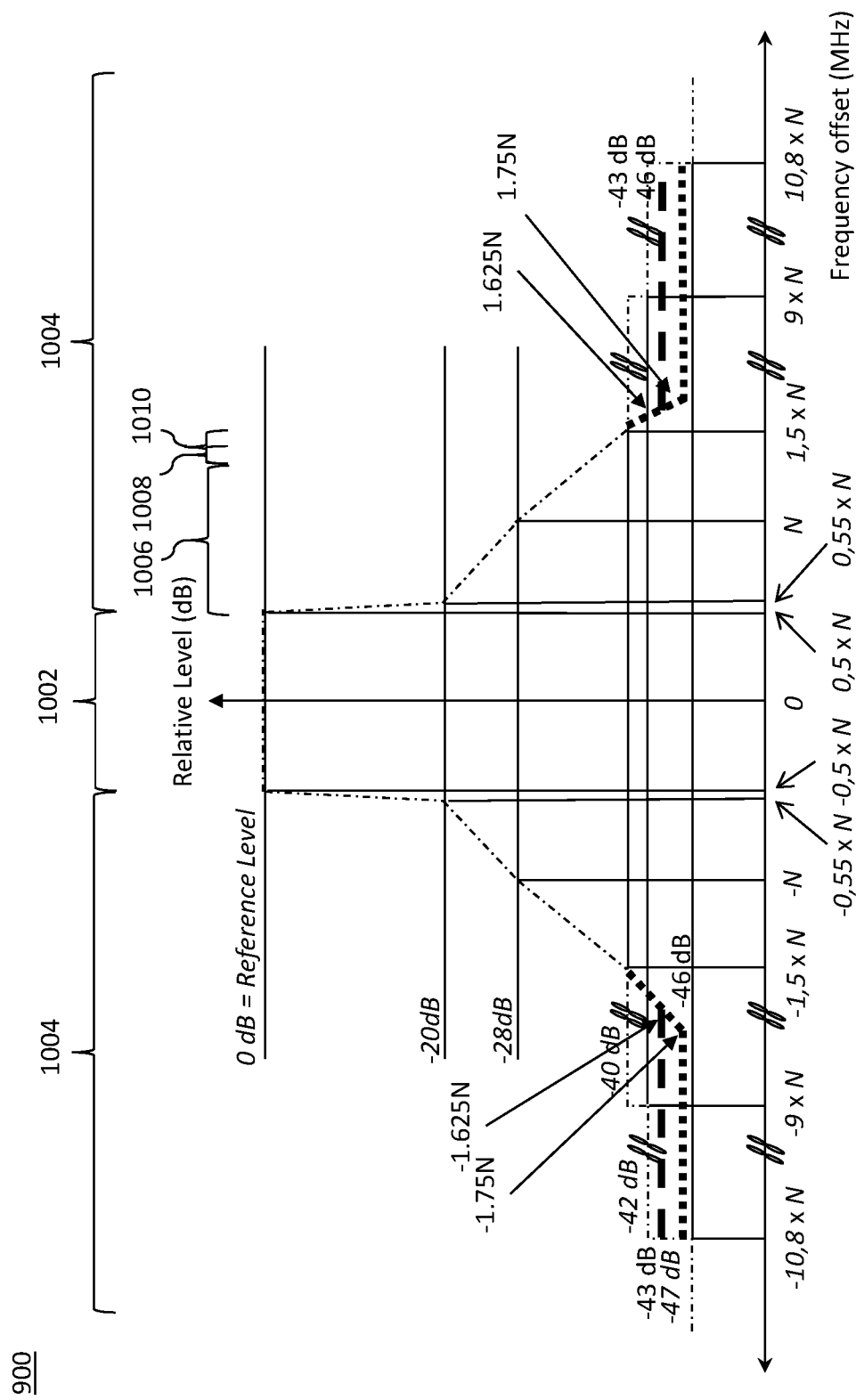
FIG. 10 is another example of a modified spectral mask which may be used by the transmitting device according to an example implementation of the present disclosure.

FIG. 10 is another example of a modified/alternative spectral mask 1000 which may be used by the transmitting device 502 according to an example implementation of the present disclosure. In some embodiments, the spectral mask 1000 may be used for channel bandwidths of 20 MHz and 40 MHz. The spectral mask 1000 may be used by transmitting devices 502 which are VLP. Similar to FIG. 8 and FIG. 9, the spectral mask 1000 may include a frequency band 1002 across a channel width of the channel, and a fall-off 1004 for frequencies outside of the channel width of the channel. In the example shown in FIG. 10, the fall-off 1004 for the spectral mask 1000 may generally follow the spectral mask defined in the one or more standards for a first frequency band 1006 (e.g., between 0.5 N or −0.5 N and 1.5 N or −1.5 N).

As shown, in FIG. 10, the slope of the fall-off 1004 between 0.5 N and 0.55 N may −400 dB/MHz, the slope of the fall-off 1004 between 0.55 N and N may be −17.77 dB/MHz, and the slope of the fall-off 1004 between N and 1.5 N may be −24 dB/MHz. Similarly, the slope of the fall-off 1004 between −0.5 N and −0.55 N may be 400 dB/MHz, the slope of the fall-off 1004 between −0.55 N and −N may be 17.77 dB/MHz, and the slope of the fall-off 1004 between −N and −1.5 N may be 24 dB/MHz. Thus, the slope of the fall-off between 0.5 N and 1.5 N (and −0.5 N and −1.5 N) may generally follow the slope of the fall-off as set forth in the spectral mask defined in the one or more standards.

In the example spectral mask 1000 shown in FIG. 10, the slope of the fall-off 1004 from N and 1.5 N may be maintained for frequencies past 1.5 N (and correspondingly, the slope of the fall-off 1004 from −N to −1.5 N may be maintained for frequencies past −1.5 N). For example, the spectral mask 1000 may include a frequency band 1008 between 1.5 N and 1.625 N. In the frequency band 1008, the maximum power may be reduced from −40 dB to −43 dB, resulting in a slope of 24 dB/MHz (which is the same as the slope of the fall-off 1004 between N and 1.5 N). In some embodiments, the spectral mask 1000 may include a frequency band 1010 between 1.5 N and 1.75 N. In the frequency band 1010, the maximum power may be reduced from −40 dB to −46 dB, resulting in a slope of 24 dB/MHz (which is the same as the slope of the fall-off 1004 between N and 1.5 N). In some embodiments, similar to the spectral mask 800 and spectral mask 900 described above, following attenuating the signal to −43 dB or −46 dB, the signal may have a constant power until reaching 10.8 N (or −10.8 N), where the maximum transmission power may generally follow the spectral mask defined by the one or more standards. By providing signal attenuation in the additional frequency band outside of the first frequency band 808, the spectral mask 900 may recover lost 20 and 40 MHz channels which are near the defined frequency, except for two 20 MHz channels and one 40 MHz channel which includes, encompasses, or otherwise carries the defined frequency.

The spectral mask determiner 510 may be configured to identify, determine configure, implement or otherwise select one of the spectral masks 512, 800, 900, 1000 described above based on a determined channel selected by the channel selector 508. The transmitting device 502 may be configured to send, emit, provide, or otherwise transmit the signal in the determined channel to the receiving device 504 according to a selected spectral mask 512. In some embodiments, the transmitting device 502 may be configured to transmit the signal according to (e.g., bounded/filtered by) the selected spectral mask 512, by modifying a maximum transmission power of the signal to cause the signal to conform to/within the selected spectral mask. In some embodiments, the transmitting device 502 may be configured to transmit the signal according to the selected mask 512 by applying one or more filters to the signal. The transmitting device 502 may be configured to provide the signal to the transmitter 508 for transmitting to the receiving device 504 according to the selected spectral mask 512.

Figure 11:
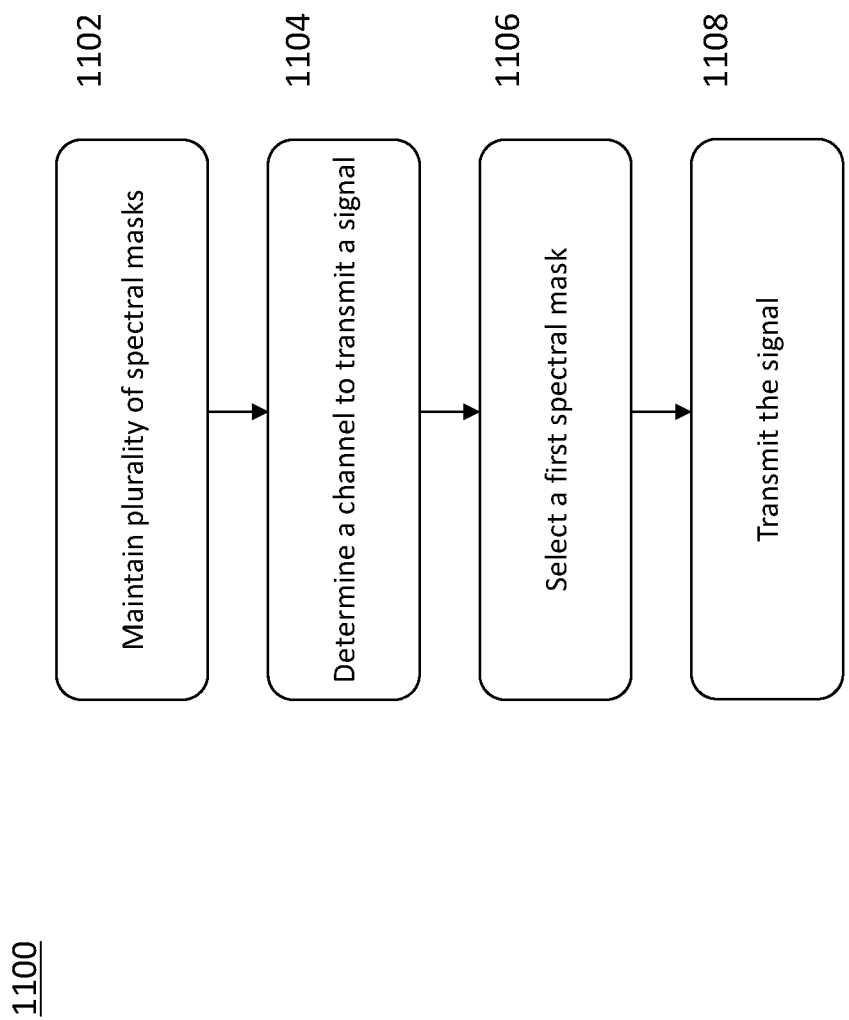
FIG. 11 is a flowchart showing a method of configuring a spectral mask according to an example implementation of the present disclosure.

Referring now to FIG. 11, depicted is a flowchart showing a method 1100 of configuring a spectral mask according to an example implementation of the present disclosure. The method 1100 may be implemented or performed by one or more of the components described above with reference to FIG. 1-3 or FIG. 5 (such as the console 110, the head wearable display 150, the computing system 314, the transmitting device 502, and so forth). As a brief overview, at step 1102, a transmitting device maintains a plurality of spectral masks. At step 1104, the transmitting device determines a channel to transmit a signal. At step 1106, the transmitting device selects a first spectral mask. At step 1108, the transmitting device transmits the signal.

In further detail, at step 1102, a transmitting device maintains a plurality of spectral masks. In some embodiments, the transmitting device may maintain/implement a plurality of spectral masks for signal transmissions. In some embodiments, the transmitting device may maintain the spectral masks responsive to various filters or signal processing elements being configured on the transmitting device. In some embodiments, the transmitting device may maintain spectral masks responsive to receiving the spectral masks (e.g., from a developer, producer, or manufacturer of the transmitting device (pre)configuring the transmitting device with the spectral masks). Examples of spectral masks which may be maintained by the transmitting device are described above with reference to FIG. 6-FIG. 10. In some embodiments, the spectral masks may define a maximum transmission power across a channel width of the channel, and a fall-off from the maximum transmission power for frequencies beyond a frequency band of the channel width. In some embodiments, such as those shown in FIG. 8 and FIG. 10, the fall-off may have a first slope for a first frequency band and a second slope for a second frequency band. The slope of the fall-off may define a maximum transmission power of the signal at each of a plurality of frequencies beyond a frequency band of the channel width. In other words, the maximum transmission power may drop between/across frequencies extending beyond the frequency band of the channel width, according to the slope of the fall-off.

In some embodiments, the transmitting device may maintain at least a first spectral mask defining a first maximum transmission power and a second spectral mask defining a second maximum transmission power. In some embodiments, the transmitting device may maintain a plurality of spectral masks including different maximum transmission powers. In some embodiments, the transmitting device may maintain a first spectral mask with a first maximum transmission power, and can update, adjust, tune, or otherwise modify the maximum transmission power to generate the second (or other spectral masks).

At step 1104, the transmitting device determines a channel to transmit a signal. In some embodiments, the transmitting device may determine a channel to transmit a signal responsive to channel negotiation with a receiving device. For example, the transmitting device may broadcast a channel negotiation packet (such as a handshake packet) on multiple channels within a frequency band. The receiving device may receive the channel negotiation packet on one of the channels, and can provide a response packet (such as a handshake accept packet) to the transmitting device on the channel. The receiving device may determine the channel responsive to receiving the response packet. As another example, the transmitting device may determine the channel based on a detected interference on other channels within a frequency band. For example, the transmitting device may hop between different channels on the frequency band until the transmitting device does not detect interference (or interference is less than a predetermined threshold). The transmitting device may determine the channel responsive to identifying a channel where the transmitting device does not detect interference or where the detected interference is less than a predetermined threshold.

At step 1106, the transmitting device selects/implements a first spectral mask. In some embodiments, the transmitting device may select a first spectral mask from the plurality of spectral masks (with varying/differing profiles for restricting transmission power across frequencies) maintained by the transmitting device. In some embodiments, the transmitting device may select the first spectral mask according to the determined channel (e.g., at step 1104). In some embodiments, the transmitting device may select the first spectral mask based on or according to a proximity of the channel to a defined frequency. The defined frequency may be, for example, 5,935 MHz. The defined frequency may be a frequency where signals are to have a corresponding power less than a predetermined threshold.

In some embodiments, the transmitting device may maintain a mapping between a plurality of channels (from which the channel determined at step 1104 is determined) and corresponding spectral masks. For example, the transmitting device may maintain a table which includes a listing of channels and spectral masks which are to be used for the corresponding channel. The transmitting device may select the first spectral mask according to a mapping between the channel determined at step 1104 and the first spectral mask. In some embodiments, a spectral mask may be mapped to multiple channels. For example, one spectral mask may be used for multiple channels which are not in close proximity to a defined frequency. Additionally, and in some embodiments, multiple spectral masks may be mapped to one channel. For instance, a channel may be mapped to a first spectral mask (such as the spectral mask shown in FIG. 6) and a second spectral mask (shown in FIG. 9). The transmitting device may select/apply one of the spectral masks based on a proximity of the determined channel to the defined frequency. For example, the transmitting device may select the spectral mask shown in FIG. 9 responsive to the channel being near or adjacent to (e.g., within a certain frequency separation from) the defined frequency.

In some embodiments, the transmitting device may maintain a mapping between a plurality of channels and a corresponding maximum transmission power. For example, the transmitting device may include or maintain a table which includes channels and corresponding maximum transmission powers which may be used on the channel. The transmitting device may determine the first spectral mask according to the corresponding maximum transmission power for the determined channel. For example, the transmitting device may modify a reference transmission power for another spectral mask to generate the first spectral mask. The transmitting device may modify the reference transmission power to match the maximum transmission power corresponding to the determined channel.

At step 1108, the transmitting device transmits the signal. In some embodiments, the transmitting device may transmit the signal in the determined channel to a receiving device according to (e.g., filtered by or in conformance with) the first spectral mask. The transmitting device may transmit the signal by applying one or more filters to the signal according to the first spectral mask. The transmitting device may transmit the signal by providing the signal to a transmitter, such as an antenna, for emitting, directing, or otherwise transmitting to the receiving device.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
 maintaining, by a transmitting device, a plurality of spectral masks for signal transmissions;
 determining, by the transmitting device, a channel to transmit a signal;

selecting, by the transmitting device, a first spectral mask from the plurality of spectral masks, to transmit the signal, the first spectral mask selected according to a mapping of the first spectral mask to the determined channel; and transmitting, by the transmitting device, the signal in the determined channel to a receiving device according to the first spectral mask.

2. The method of claim 1, comprising selecting the first spectral mask from the plurality of spectral masks according to a proximity of the channel to a defined frequency.

3. The method of claim 2, wherein the defined frequency is at 5935 megaHertz.

4. The method of claim 1, wherein the first spectral mask defines a maximum transmission power across a channel width of the channel, and a fall-off from the maximum transmission power for frequencies beyond a frequency band of the channel width.

5. The method of claim 4, wherein the fall-off has a first slope for a first frequency band and a second slope for a second frequency band, wherein the first frequency band is between the frequency band of the channel width and the second frequency band.

6. The method of claim 4, wherein the fall-off has a slope that defines a maximum transmission power of the signal at each of a plurality of frequencies beyond a frequency band of the channel width.

7. The method of claim 1, comprising:
maintaining, by the transmitting device, a mapping between each of a plurality of channels and at least one corresponding spectral mask of the plurality of spectral masks; and
selecting, by the transmitting device, the first spectral mask according to the mapping between the determined channel and the first spectral mask.

8. The method of claim 7, wherein selecting the first spectral mask comprises:
determining, by the transmitting device according to the mapping, that the first spectral mask and a second spectral mask are mapped to the determined channel; and
selecting, by the transmitting device, the first spectral mask instead of the second spectral mask, according to a proximity of the determined channel to a defined frequency.

9. The method of claim 1, wherein the mapping comprises a first mapping, the method further comprising:
maintaining, by the transmitting device, a second mapping between each of a plurality of channels and a corresponding maximum transmission power; and
determining, by the transmitting device, the first spectral mask according to the corresponding maximum transmission power for the determined channel.

10. The method of claim 1, wherein maintaining the plurality of spectral masks comprises maintaining, by the transmitting device, a first spectral mask defining a first maximum transmission power and a second spectral mask defining a second maximum transmission power.

11. A transmitting device, comprising:
one or more processors configured to:
maintain a plurality of spectral masks for signal transmissions;
determine a channel to transmit a signal;
select a first spectral mask from the plurality of spectral masks, to transmit the signal, the first spectral mask selected according to a mapping of the first spectral mask to the determined channel; and
transmit the signal in the determined channel to a receiving device according to the first spectral mask.

12. The transmitting device of claim 11, wherein the one or more processors are configured to select the first spectral mask from the plurality of spectral masks according to a proximity of the channel to a defined frequency.

13. The transmitting device of claim 11, wherein the first spectral mask defines a maximum transmission power across a channel width of the channel, and a fall-off from the maximum transmission power for frequencies beyond a frequency band of the channel width.

14. The transmitting device of claim 13, wherein the fall-off has a first slope for a first frequency band and a second slope for a second frequency band, wherein the first frequency band is between the frequency band of the channel width and the second frequency band.

15. The transmitting device of claim 13, wherein the fall-off has a slope that defines a maximum transmission power of the signal at each of a plurality of frequencies beyond a frequency band of the channel width.

16. The transmitting device of claim 11, wherein the one or more processors are further configured to:
maintain a mapping between each of a plurality of channels and at least one corresponding spectral mask of the plurality of spectral masks; and
select the first spectral mask according to the mapping between the determined channel and the first spectral mask.

17. The transmitting device of claim 16, wherein selecting the first spectral mask comprises:
determining, according to the mapping, that the first spectral mask and a second spectral mask are mapped to the determined channel; and
selecting the first spectral mask instead of the second spectral mask, according to a proximity of the determined channel to a defined frequency.

18. The transmitting device of claim 11, wherein the mapping comprises a first mapping, wherein the one or more processors are further configured to:
maintain a second mapping between each of a plurality of channels and a corresponding maximum transmission power; and
determine the first spectral mask according to the corresponding maximum transmission power for the determined channel.

19. The transmitting device of claim 11, wherein maintaining the plurality of spectral masks comprises maintaining a first spectral mask defining a first maximum transmission power and a second spectral mask defining a second maximum transmission power.

20. A non-transitory computer readable medium storing instructions that, when executed by one or more processors, cause the one or more processors to:
maintain a plurality of spectral masks for signal transmissions;
determine a channel to transmit a signal;
select a first spectral mask from the plurality of spectral masks, to transmit the signal, the first spectral mask selected according to a mapping of the first spectral mask to the determined channel; and
transmit the signal in the determined channel to a receiving device according to the first spectral mask.

* * * * *